US007350186B2

(12) United States Patent
Coleman et al.

(10) Patent No.: US 7,350,186 B2
(45) Date of Patent: Mar. 25, 2008

(54) METHODS AND APPARATUS FOR MANAGING COMPUTING DEPLOYMENT IN PRESENCE OF VARIABLE WORKLOAD

(75) Inventors: David Wiley Coleman, New Fairfield, CT (US); Steven E. Froehlich, Danbury, CT (US); Joseph L. Hellerstein, Ossining, NY (US); Lawrence S. Hsiung, Los Altos, CA (US); Edwin Richie Lassettre, Los Gatos, CA (US); Todd William Mummert, Carmel, NY (US); Mukund Raghavachari, Baldwin Place, NY (US); Lance Warren Russell, Hollister, CA (US); Maheswaran Surendra, Croton-on-Hudson, NY (US); Noshir Cavas Wadia, Morgan Hill, CA (US); Peng Ye, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 10/384,973

(22) Filed: Mar. 10, 2003

(65) Prior Publication Data
US 2004/0181794 A1 Sep. 16, 2004

(51) Int. Cl.
*G06F 9/44* (2006.01)
(52) U.S. Cl. .................. 717/103; 717/172; 717/177
(58) Field of Classification Search ........ 717/101–103, 717/120–121, 171–172, 176–177
See application file for complete search history.

(56) References Cited
U.S. PATENT DOCUMENTS 5,878,224 A    3/1999   Smith
6,006,196 A   12/1999   Feigin et al.
6,256,773 B1   7/2001   Bowman-Amuah
6,269,078 B1   7/2001   Lakshman et al.
6,516,350 B1   2/2003   Lumelsky et al.
7,039,559 B2 * 5/2006   Froehlich et al. ........... 702/187
2002/0152305 A1 10/2002 Jackson et al.
2004/0181370 A1  9/2004   Froehlich et al.

OTHER PUBLICATIONS

Chandra et al., "An Online Optimization-based Technique For Dynamic Resource Allocation In GPS Servers", Dept. of Computer Science, University of Massachusetts, Techinical report TR02-30, pp. 1-12, Jul. 2002.*
P. Horn, "Autonomic Computing: IBM's Perspective on the State of Information Technology," IBM Research, Oct. 2001.
X. Zhu et al., "Optimal Resource Assignment in Internet Data Centers," IEEE, pp. 61-69, Aug. 2001.
J. Jann et al., "Web Applications and Dynamic Reconfiguration in UNIX Servers," IEEE, pp. 186-194, Mar. 2003.
K.K. Goswami et al., "Prediction-Based Dynamic Load-Sharing Heuristics," IEEE Transactions on Parallel and Distributed Systems, vol. 4, No. 6, pp. 638-648.

* cited by examiner

*Primary Examiner*—Ted T. Vo
(74) *Attorney, Agent, or Firm*—Mark Wardas; Ryan, Mason & Lewis, LLP (57) ABSTRACT

Automated or autonomic techniques for managing deployment of one or more resources in a computing environment based on varying workload levels. The automated techniques may comprise predicting a future workload level based on data associated with the computing environment. Then, an estimation is performed to determine whether a current resource deployment is insufficient, sufficient, or overly sufficient to satisfy the future workload level. Then, one or more actions are caused to be taken when the current resource deployment is estimated to be insufficient or overly sufficient to satisfy the future workload level. Actions may comprise resource provisioning, resource tuning and/or admission control.

26 Claims, 4 Drawing Sheets

METHODS AND APPARATUS FOR MANAGING COMPUTING DEPLOYMENT IN PRESENCE OF VARIABLE WORKLOAD

CROSS REFERENCE TO RELATED APPLICATION

The present application is related to U.S. patent application identified by application Ser. No. 10/385,265, entitled "Methods and Apparatus for Managing Computing Deployments in Presence of Variable Workloads," filed concurrently herewith, the disclosure of which is incorporated by reference herein.

FIELD OF THE INVENTION

The present invention relates generally to management of computing systems or networks and, more particularly, to techniques for managing computing deployment associated with such a system or network in the presence of variable workload.

BACKGROUND OF THE INVENTION

An important challenge in managing deployments of computing resources in a computing system or network is dealing with variable traffic. For instance, in a computing system or network associated with the World Wide Web or Internet, it is important to have sufficient computing resources (e.g., web servers, application servers, transaction/database servers) supporting a web site to ensure that the end-user experience is not compromised (e.g., by slow response time), even when the web site is under heavy load with respect to the utilization of one or more applications executed in association with the web site. As is known, an application generally refers to a one or more computer programs designed to perform one or more specific functions, e.g., supply chain management.

One approach to sizing a deployment supporting a particular application is to estimate the anticipated workload traffic pattern, and use enough resources to accommodate the peak anticipated load, using capacity planning approaches. This static arrangement can result in significant resource under-utilization since most workload traffic is quite variable, e.g., with marked diurnal, weekly, etc., patterns.

A refinement on the above approach is to do scheduled or planned source reallocation based on a long-term (e.g., one to several days) forecast of anticipated traffic. This approach is also often inadequate as it relies on the accuracy of a long-term forecast (which may, e.g., underestimate the success of a sales promotion) and is also exposed to unanticipated events (e.g., a traffic surge at news web sites such as experienced at CNN's web site on Sep. 11, 2001).

Another key disadvantage of existing computing deployment approaches is that they generally require some form of manual intervention, e.g., via expert operators, to adjust for resource imbalance.

Accordingly, it would be desirable to have automated or autonomic techniques for managing a computing deployment, associated with a computing system or network, which handle variable workload more efficiently and effectively than existing approaches.

SUMMARY OF THE INVENTION

The present invention provides automated or autonomic techniques for managing a computing deployment, associated with a computing system or network, which handle variable workload more efficiently and effectively than existing approaches.

In one aspect of the invention, techniques are provided for managing deployment of one or more resources in a computing environment based on varying workload levels. The techniques may comprise predicting a future workload level based on data associated with the computing environment. Then, an estimation is performed to determine whether a current resource deployment is insufficient, sufficient, or overly sufficient to satisfy the future workload level. Then, one or more actions are caused to be taken when the current resource deployment is estimated to be insufficient or overly sufficient to satisfy the future workload level. Actions may comprise resource provisioning, resource tuning and/or admission control.

Advantageously, the present invention may provide for proactively maintaining a service level objective, such as response time, for a computing deployment in the face of variable workload. In particular, by making changes to a computing deployment in an automated or autonomic fashion, the techniques employed by the invention are effective at accommodating unanticipated workload.

The present invention also advantageously provides a methodology for an application owner to attempt to ensure satisfaction of one or more service objectives associated with the execution of an application that is hosted by a service provider. This may be accomplished by the application owner contracting with the service provider to host the application and to implement a computing deployment management system as provided herein.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative web-based computing network environment. That is, the computing resources being managed (e.g., application servers, database connections, input/output paths, etc.) are associated with one or more web sites. However, it is to be understood that the present invention is not limited to such a particular environment. Rather, the invention is more generally applicable to any computing environment in which it is desirable to automatically or autonomically manage and compute resource deployment in the face of variable workload.

As is known, "autonomic" computing generally refers to a comprehensive and holistic approach to self-managed computing systems with a minimum of human interference, see, e.g., P. Horn, "Autonomic Computing: IBM's Perspective on the State of Information Technology," IBM Research, October 2001, the disclosure of which is incorporated by reference herein. The term derives from the body's autonomic nervous system, which controls key functions without conscious awareness or involvement. More specifically, one of the goals of autonomic computing is to automate some or all of the tasks an expert operator or administrator would typically carry out. Thus, as will be appreciated from the inventive principles presented herein, the computing deployment techniques of the invention are able to operate automatically or autonomically.

Figure 1:
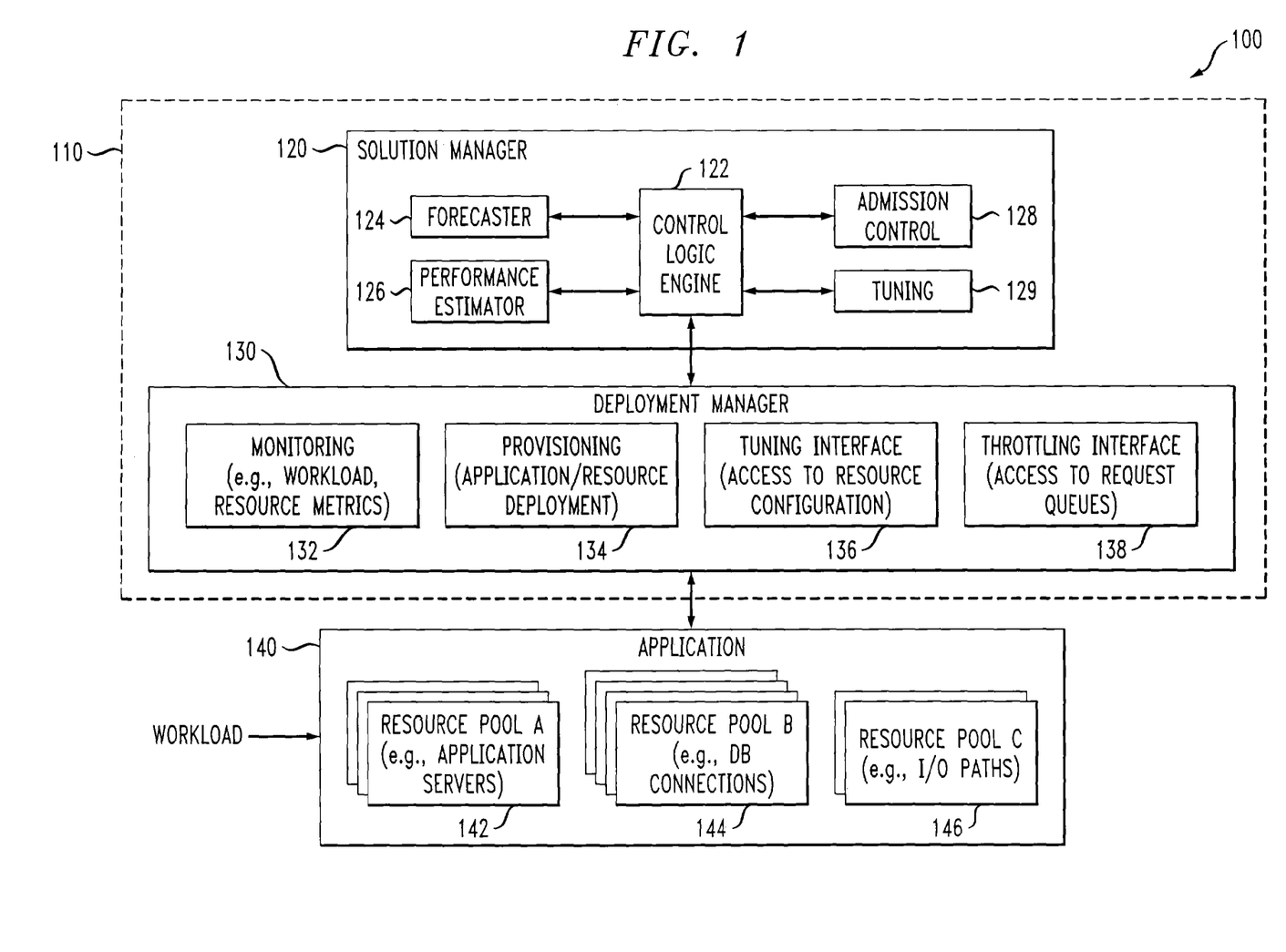
FIG. 1 is a block diagram illustrating a computing deployment management system according to an embodiment of the present invention and an overall environment in which such system may operate.

Referring initially to FIG. 1, a block diagram illustrates a computing deployment management system according to an embodiment of the present invention and an overall environment in which such system may operate. As shown, the environment 100 comprises a computing deployment management system 100. The computing deployment management system 100, itself, comprises a solution manager 120 and a deployment manager 130. The solution manager 120, itself, comprises a control logic engine 122, a forecaster module 124, a performance estimator module 126, an admission control module 128, and a tuning module 129. The deployment manager 130, itself, comprises a monitoring module 132, a provisioning module 134, a tuning interface module 136, and a throttling interface module 138.

Further, as shown, the environment 100 comprises an application level 140. The application level, itself, comprises resource pool 142 (resource pool A comprising, for example, application servers), resource pool 144 (resource pool B comprising, for example, database connections), and resource pool 146 (resource pool C comprising, for example, input/output paths).

Accordingly, the architecture shown in FIG. 1 is organized into three levels: (a) the application level (denoted as 140) and associated resources on which the application can be deployed; (b) a deployment management level (denoted as 130) which provides connection and control of resources; and (c) a solution management level (denoted as 120) which performs the real-time analysis and planning required to initiate actions that are required to maintain a service level objective. These three levels are discussed in further detail below.

Application deployment typically requires a mix of resources of various types, such as, for example, an HTTP (hypertext transport protocol) server, an application server, a database server, storage, connections, I/O paths, etc. In a typical computing deployment (e.g., a data center), these resources could be available from a managed pool. FIG. 1 illustrates three such managed resource pools 142, 144 and 146. It is understood that, depending on the application, a predetermined number of each of the resources, sufficient to satisfy anticipated workloads, is available for use in the managed resource pools. It is to be further understood that while FIG. 1, and the above description, mention certain resources, the invention is not limited to any particular resources. Rather, the invention may manage any and all types of resources including, but not limited to, hardware components, software components, and combinations thereof. It is to be understood that a resource may also be an application, itself, or some portion thereof.

The deployment manager 130 interfaces with relevant resources of the application level 140 to monitor measurement/configuration data (e.g., through resource-dependent sensors such as, for example, response time probes, vmstat data from the operating system such as Unix, snapshot data from a database such as IBM Corporation's DB2, or through custom interfaces or standard interfaces implemented using the Common Information Model) and to control the resources (e.g., through resource-dependent effectuators such as, for example, the node agent on an application server such as IBM Corporation's WebSphere Application Server, the application programming interface for changing configuration parameters in a database such as IBM Corporation's DB2). Hence, the deployment manager is able to perform resource provisioning (via provisioning module 134) which, by way of example, for a piece of hardware, can range from: (i) deploying an operating system on a computer without an installed operating system, e.g., an x86 system on which Windows or Linux can be installed, or replacing an existing operating system on a computer with a new operating system; (ii) deploying appropriate middleware on top of the operating system; (iii) deploying an application with associated data; and (iv) performing relevant cluster management/federation to enable an added resource to support the application. Advantageous features of this provisioning capability include not only rapidly and automatically adding resources when needed, for example, in response to an unexpected workload surge, but also removing resources when no longer needed, hence minimizing the greater cost of additional resources.

In addition, the deployment manager 130 (via tuning interface module 136) resets resource configuration parameters (e.g., memory pool sizes such as buffer pools for a database, ORB (object request broker) thread pool size in an application server) which is important for resource tuning. Resource tuning generally refers to the technique of changing one or more configuration parameters associated with a resource in a manner which helps achieve a goal such as minimizing response time or maximizing throughput. The deployment manager 130 (via throttling interface module 138) also manipulates admission queues on the resources (e.g., for admission control/request throttling). Throttling generally refers to rejecting incoming requests based on some policies that identify service classes such as, for example, type of request (buy versus browse at an e-commerce site which can be distinguished by a uniform resource locator), origin (preferred customers), etc. By rejecting such requests, the incoming load to a computing deployment may be reduced to a manageable level. The deployment manager (via monitoring module 132) also provides access to the workload data (e.g., throughput, response time, etc.).

The solution manager 120 is responsible for maintaining the service objective for the particular application deployment. "Service objective" may refer to requirements and/or preferences specified in accordance with a service level agreement (SLA). That is, by way of example, such service objectives may deal with how service applications are hosted at a third party infrastructure, while ensuring a certain level of end-client satisfaction. As is known, businesses increasingly run their applications using infrastructure (e.g., server, network connectivity) provided by a third party, generally referred to as the "service provider." Many companies, such as IBM Global Services, host web sites and/or provide other computer hosting services. An SLA provides a means by which the expectations of the service provider can be negotiated with the customer. An SLA between an application owner and the service provider defines terms and conditions for this hosting service. The SLA may, for example, include expected response time, bandwidth throughput at the network and/or servers, disk space utilization, availability, i.e., up-time of network and server resources, as well as recovery time upon failure, and pricing for various levels of service. However, it is to be appreciated that a service objective does not have to come from an SLA, which typically has legal consequences. A service level objective can often be negotiated within an enterprise, e.g., between the information technology (IT) department and the purchasing department for whom they may be deploying an online purchase order system. Also an e-commerce site or even a place like Google may want to maintain a good service level, with regard to something like response time,so that the user experience is good.

Accordingly, so as to sufficiently maintain the particular service objectives, the solution manager 120, in accordance with the control logic engine 122, decides: (i) when action needs to be taken; and (ii) what action to take. The control logic engine 122 accomplishes these tasks, as will be explained below, in accordance with forecaster module 124, performance estimator module 126, admission control module 128, and tuning module 129. That is, it is to be understood that the control logic engine (CLE) 122 serves as a controller for the functions provided by the other modules in the solution manager 120. It is to be understood, however, that the functional arrangement shown in block 120 is illustrative in nature and, thus, other arrangements for controlling the functionality provided by the solution manager may be employed within the scope of the principles of the present invention.

One advantageous feature of the solution manager is the ability to proactively manage the service objective, hence, minimizing/avoiding a possible violation. This is accomplished by a combination of forecasting (via forecaster module 124) on the workload (obtained from the monitoring component in the deployment manager) in combination with performance estimation (via performance estimator 126) to check if a service level violation is anticipated. In a preferred embodiment, the control logic component 122 is essentially a rule based component that, based on the forecasting and performance estimation results, decides which action or actions to take. Examples of actions that can be taken include provisioning (adding/removing resources), admission control, and resource tuning.

Resource tuning may be effective when the workload changes. For instance, in a e-commerce site, the relative buy to browse mix can change, and since these transactions can draw on somewhat different resources in a database, e.g., such as use different buffer pools, or require more sorting, the overall system responsiveness may be improved by changing database configuration parameters, such as relative buffer pool sizes, or sort heaps. This is determined and accomplished by the tuning module 129, via the tuning interface 136.

Admission control actually rejects some of the incoming requests based on some policy, e.g., admit only preferred customers, or only buy transactions, such that the system is not overloaded. This kind of action may be taken if others actions such as provisioning or resource tuning cannot achieve the desired results.

In any case, the magnitude of the action (e.g., how many servers to add, how much to change a configuration parameter) is determined using the performance estimation capability. These actions could be taken separately or in combination.

The following is an illustrative description of a functional operation of a computing deployment management system according to the present invention. In this example, one type of control action is considered, namely, application provisioning, which is accomplished by server addition to/removal from the active cluster.

Figure 2:
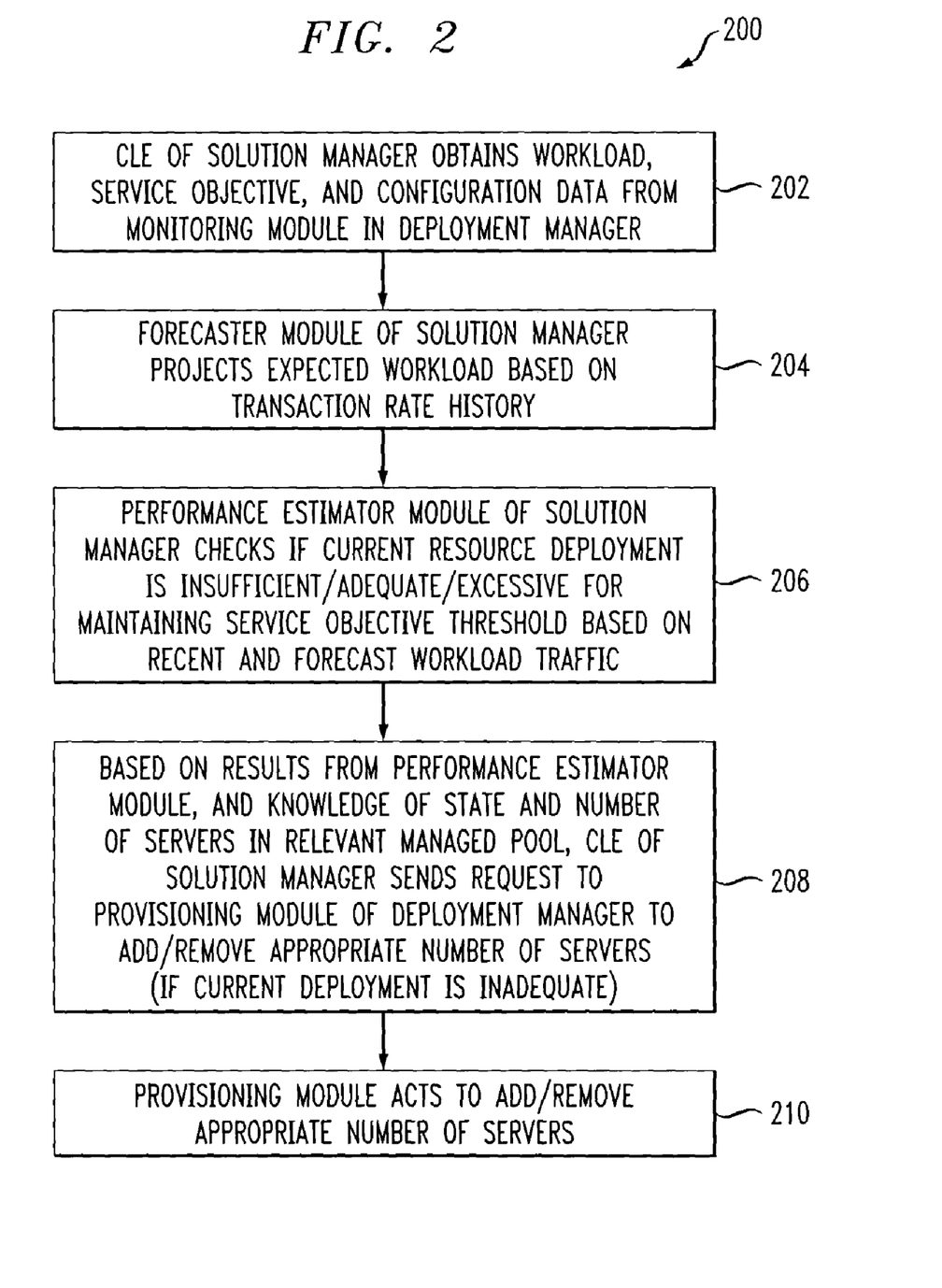
FIG. 2 is a flow diagram illustrating a computing deployment management methodology according to an embodiment of the present invention.

Referring now to FIG. 2, a flow diagram illustrates a computing deployment management methodology 200 according to an embodiment of the present invention.

The solution manager 120 keeps track of the workload (transaction rate), service objective (response time), and configuration (resources which are active, idle, and in transition states) that the control logic engine (CLE) 122 obtains from the monitoring module 132 in the deployment manager 130 (step 202).

Based on monitored data such as the transaction rate history, the solution manager 120 uses the forecaster module 124 to project into the future the expected workload (step 204). The forecast can be long-term (e.g., hours/days) or short-term (e.g., seconds/minutes). To deal with unanticipated changes in the workload (e.g., outside of normal daily/weekly, etc.) variations, the forecaster is preferably adaptive and rapidly learns from recent history. The forecast horizon does not need to be long, e.g., the horizon may be approximately the amount of time needed for the resource action (application provisioning in this situation) to take effect.

In a preferred embodiment, the forecaster module 124 may be implemented using the techniques described in U.S. Pat. No. 7,039 559, entitled "Methods and Apparatus for Performing Adaptive and Robust Prediction," filed concurrently herewith, the disclosure of which is incorporated by reference herein. However, it is to be appreciated that the forecaster module 124 may employ other forecasting techniques such as, for example, those described in "Time Series Analysis: Forecasting and Control," by G.E.P. Box et al. (rev. ed.), the disclosure of which is incorporated by reference herein, or those employed in the Hyperion Forecasting Suite available from Hyperion. It is to be understood that the invention is not limited to any particular forecasting technique.

The solution manager 120 then uses the performance estimator 126 to check if the current resource deployment is insufficient, sufficient (i.e., adequate) or overly sufficient (i.e., excessive) for maintaining the service objective threshold (e.g., response time) based on the recent and forecasted workload traffic (step 206). While the invention is not limited to any particular performance estimation techniques, examples of such techniques that may be employed include those described in "Configuration and Capacity Planning for Solaris Servers," by Brian L Wong, and "Capacity Planning for Web Services: Metrics, Models, and Methods" by Daniel A. Menasce et al., and/or those referred to as PATROL Perfom and PATROL Predict from BMC Software, and High Volume Web Site Performance Simulator for Websphere from IBM Corporation. Based on recommendations of the performance estimator, and knowledge of state and number servers in the relevant resource pool, the solution manager 120 sends a request to the application provisioner 134 in the deployment manager 130 to add/remove the appropriate number of servers, if necessary (step 208). That is, if it is determined by the CLE 122 that the current resources are sufficient, then no provisioning may be necessary at this time.

If provisioning is needed (step 210), the provisioner 134 acts rapidly to add a server from the idle state to the active cluster running the application. Rapid addition (e.g., from about several minutes to less than about one minute) may be achieved by a combination of loading saved application images on the server instance being added, starting the server, and allowing the cluster manager to send requests to it. Note that speed of resource addition may be increased if the servers are preloaded with the application image. Hence, the preloaded servers need only to be started and activated within the cluster. To remove the server from the active cluster, the provisioner 134 disables new incoming requests to the server from the cluster manager, while allowing existing work to continue. This allows a natural quiescing of the work on that server, which is then stopped.

It is to be appreciated that by use herein of the phrases "insufficient" and "overly sufficient" (and, similarly, "inadequate" and "excessive") with respect to computing resources, it is generally not only meant that there are not enough (insufficient) resources deployed or too many (overly sufficient) resources deployed, but also that one or more resources are improperly configured to meet the anticipated workload (e.g., due to a workload mix change, etc.) or that certain admission requests that should not be admitted are being admitted. Thus, in accordance with the invention, the resource deployment may be made "sufficient" (or, similarly, "adequate") not only by adding or removing resources, but also by tuning one or more resources and/or throttling certain admission requests.

The following description provides some results from an exemplary implementation of the management system described herein. In the exemplary deployment considered, the application is a supply chain management. The application is run on a cluster of web application servers with a database server in the back-end. In this example, the system is faced with a large unanticipated surge of incoming transactions requests (doubling every minute to about 20 times the normal load) while trying to stay below a response time service objective of two seconds. The prediction horizon of the short term forecaster is one minute, since the rapid application deployment capability of the provisioner is about 30 to 40 seconds.

Figure 3:
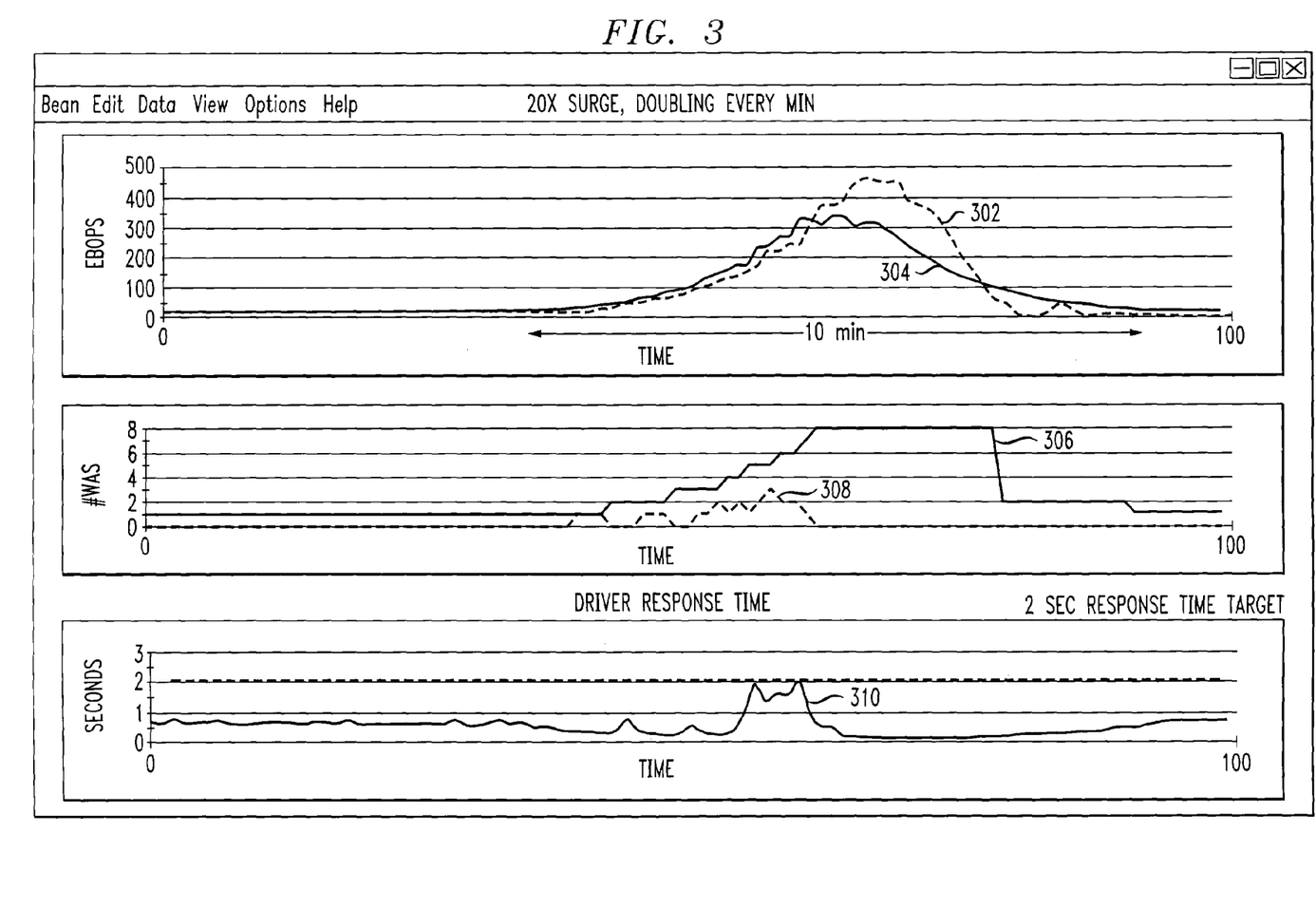
FIG. 3 is a graphical representation illustrating performance of a computing system or network in accordance with principles of the present invention.

The performance of the system is shown in FIG. 3. The prediction of the transaction rate (top panel of FIG. 3, line 302) initially lags the surge in the actual transaction rate (top panel of FIG. 3, line 304), but very quickly catches up and is able to provide useful guidance on the anticipated transaction rate. This is in turn used to calculate the requisite number of application servers using the performance estimator (126 of FIG. 1), and the servers are quickly brought into active (middle panel of FIG. 3, line 306) duty with the rapid provisioning capability of the application provisioner (134 of FIG. 1). The amount of time a server is in the transitional starting state (middle panel of FIG. 3, line 308) while going from idle to active is only about 30 seconds. The combination of the forecasting and performance estimation in the solution manager together with the rapid application provisioning capability of the deployment manager allows the system to stay below the two second response time target (bottom panel of FIG. 3, line 310) in the face of an extremely aggressive surge. After the surge is over, the servers are returned to the pool.

Figure 4:
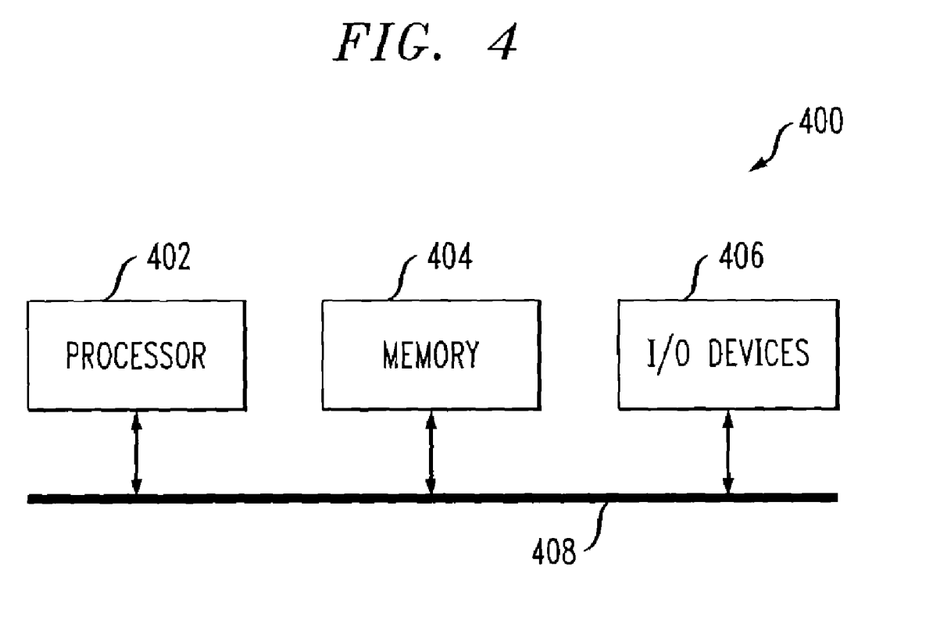
FIG. 4 is a block diagram illustrating a generalized hardware architecture of a computer system suitable for implementing a computing deployment management system according to the present invention.

Referring now to FIG. 4, a block diagram illustrates a generalized hardware architecture of a computer system suitable for implementing a computing deployment management system according to the present invention. For instance, the functional components shown in FIG. 1 with respect to the solution manager 120 and the deployment manager 130 may be implemented on one or more computer systems of the type shown in FIG. 4. Of course, separate functional components may be implemented on their own dedicated computer system. However, it is to be appreciated that the computing deployment management system of the invention is not intended to be limited to any particular computer platform, arrangement or implementation.

In this illustrative implementation 400, a processor 402 for implementing management methodologies and functionalities of the invention as described herein is operatively coupled to a memory 404 and input/output (I/O) devices 406, via a bus 408 or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc. The memory may preferably be used to store data and computer programs associated with the invention.

In addition, the term "I/O devices" as used herein is intended to include one or more input devices (e.g., keyboard, mouse) for inputting data to the processing unit, as well as one or more output devices (e.g., CRT display) for providing results associated with the processing unit.

It is to be appreciated that the methodologies of the present invention are capable of being implemented in the form of computer readable media. The term "computer readable media" as used herein is intended to include recordable-type media, such as, for example, a floppy disk, a hard disk drive, RAM, compact disk (CD) ROM, etc., as well as transmission-type media.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 402.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Accordingly, as explained herein in detail, the present invention provides an architecture which enables automated proactive management of a system in the face of variable workload or unexpected workload variability. That is, a system for proactive management of computer applications that experience unexpected variability in demand is provided which may comprise components for forecasting, performance modeling, control, and reconfiguration. The forecasting is used to anticipate future workload and actions are taken sufficiently rapidly to accommodate the anticipated workload, while reducing exposure to potential violations of a service level objective. Actions are taken in a cost-effective manner that minimizes resource under-utilization while avoiding excessive repeated resource configuration changes, i.e., oscillations. Actions taken are based on models/estimations of performance based on available resources together with anticipated workload and consideration of the service objective. Actions may include resource provisioning and/or resource tuning and/or admission control.

An architecture of the invention may be structured into: (a) an application to be managed; (b) a deployment manager that provides a generic interface to that system for sensing and effecting control; and (c) a solution manager that determines when actions are to be taken based on this generic interface to monitoring, and requests the necessary actions through the generic control interface. The deployment manager can manage multiple configurations, allowing for rapid deployment or redeployment of resources as a result of being able to: (a) take actions specific to a particular resource node, a particular configuration, or particular function; and (b) automatically set application appropriate database paths and parameters.

As is further evident, the invention further provides techniques operating an adaptive system in which: (a) workload and service level metrics are collected; (b) future values of workload measurements are forecast; (c) these forecasted values and the desired service level objective are used to determine the actions required to ensure adequate service levels; and (d) the actions themselves are initiated in a way that minimizes oscillations and yet responds promptly.

Although illustrative embodiments of the present invention have been described herein with reference to the accompanying drawings, it is to be understood that the invention is not limited to those precise embodiments, and that various other changes and modifications may be made therein by one skilled in the art without departing from the scope or spirit of the invention.

What is claimed is:

1. An automated method of managing deployment of a plurality of servers in a computing environment based on varying workload levels, the method comprising the steps of:
   predicting a future workload level based on data associated with the computing environment, wherein the predicting step further comprises forecasting based on a forecast horizon;
   estimating whether a current deployment of servers is one of insufficient, sufficient, and overly sufficient to satisfy the future workload level; and
   causing one or more actions to be taken when the current deployment of servers is estimated to be one of insufficient and overly sufficient to satisfy the future workload level;
   wherein the action causing step further comprises causing the addition of one or more servers to address the future workload level when the current deployment of servers is estimated to be insufficient;
   wherein the action causing step further comprises causing the removal of one or more servers to address the future workload level when the current deployment of servers is estimated to be overly sufficient; and
   wherein the forecast horizon is selectively adaptable as a function of a time needed to effectuate at least one of the one or more actions to be taken when the current deployment of servers is estimated to be one of insufficient and overly sufficient to satisfy the future workload level.

2. The method of claim 1, further comprising the step of obtaining the data associated with the computing environment, used by the future workload level predicting step, via monitoring one or more of the servers.

3. The method of claim 1, wherein the action causing step further comprises causing the tuning of one or more configuration parameters associated with the servers.

4. The method of claim 1, wherein the action causing step further comprises causing the manipulation of admission queues on the servers.

5. The method of claim 1, wherein the estimating step further comprises estimating whether a current deployment of servers is one of insufficient, sufficient, and overly sufficient based on one or more service objectives.

6. The method of claim 1, wherein the action causing step further comprises deploying an operating system on a computer without an installed operating system or replacing an existing operating system.

7. The method of claim 1, wherein the action causing step further comprises deploying middleware on top of an operating system.

8. The method of claim 1, wherein the action causing step further comprises deploying an application with associated data.

9. The method of claim 1, wherein the action causing step further comprises performing cluster management to enable an added server to support an application.

10. Apparatus for managing deployment of a plurality of servers in a computing environment based on varying workload levels, the apparatus comprising:
    a memory; and
    at least one processor coupled to the memory and operative to: (i) predict a future workload level based on data associated with the computing environment, wherein the predicting operation further comprises forecasting based on a forecast horizon; (ii) estimate whether a current deployment of servers is one of insufficient, sufficient, and overly sufficient to satisfy the future workload level; and (iii) cause one or more actions to be taken when the current deployment of servers is estimated to be one of insufficient and overly sufficient to satisfy the future workload level; wherein the action causing step further comprises causing the addition of one or more servers to address the future workload level when the current deployment of servers is estimated to be insufficient; wherein the action causing step further comprises causing the removal of one or more servers to address the future workload level when the current deployment of servers is estimated to be overly sufficient; and wherein the forecast horizon is selectively adaptable as a function of a time needed to effectuate at least one of the one or more actions to be taken when the current deployment of servers is estimated to be one of insufficient and overly sufficient to satisfy the future workload level.

11. The apparatus of claim 10, wherein the at least one processor is further operative to obtain the data associated with the computing environment, used by the future workload level predicting step, via monitoring one or more of the servers.

12. The apparatus of claim 10, wherein the action causing operation further comprises causing the addition of one or more servers to address the future workload level when the current deployment of servers is estimated to be insufficient.

13. The apparatus of claim 10, wherein the action causing operation further comprises causing the removal of one or more servers to address the future workload level when the current deployment of servers is estimated to be overly sufficient.

14. The apparatus of claim 10, wherein the action causing operation further comprises causing the tuning of one or more configuration parameters associated with the servers.

15. The apparatus of claim 10, wherein the action causing operation further comprises causing the manipulation of admission queues on the servers.

16. The apparatus of claim 10, wherein the estimating operation further comprises estimating whether a current deployment of servers is one of insufficient, sufficient, and overly sufficient based on one or more service objectives.

17. An article of manufacture for managing deployment of a plurality of servers in a computing environment based on varying workload levels, comprising a computer readable storage medium containing one or more programs which when executed implement the steps of:
   predicting a future workload level based on data associated with the computing environment, wherein the predicting step further comprises forecasting based on a forecast horizon;
   estimating whether a current deployment of servers is one of insufficient, sufficient, and overly sufficient to satisfy the future workload level; and
   causing one or more actions to be taken when the current deployment of servers is estimated to be one of insufficient and overly sufficient to satisfy the future workload level;
   wherein the action causing step further comprises causing the addition of one or more servers to address the future workload level when the current deployment of servers is estimated to be insufficient;
   wherein the action causing step further comprises causing the removal of one or more servers to address the future workload level when the current deployment of servers is estimated to be overly sufficient; and
   wherein the forecast horizon is selectively adaptable as a function of a time needed to effectuate at least one of the one or more actions to be taken when the current deployment of servers is estimated to be one of insufficient and overly sufficient to satisfy, the future workload level.

18. The article of claim 17, further comprising the step of obtaining the data associated with the computing environment, used by the future workload level predicting step, via monitoring one or more of the servers.

19. The article of claim 17, wherein the action causing step further comprises causing the tuning of one or more configuration parameters associated with the servers.

20. The article of claim 17, wherein the action causing step further comprises causing the manipulation of admission queues on the servers.

21. The article of claim 17, wherein the estimating step further comprises estimating whether a current deployment of servers is one of insufficient, sufficient, and overly sufficient based on one or more service objectives.

22. An automated system for managing deployment of a plurality of servers in a computing environment based on varying workload levels, the system comprising:
   a solution manager comprising a memory and at least one processor coupled thereto and operative to: (i) predict a future workload level based on data associated with the computing environment; (ii) estimate whether a current deployment of servers is one of insufficient, sufficient, and overly sufficient to satisfy the future workload level; and
   a deployment manager coupled to the solution manager, comprising a memory and at least one processor coupled thereto and operative to: (i) provide the data associated with the computing environment to the solution manager; and (ii) effect one or more actions to be taken, in response to the solution manager, when the current deployment of servers is estimated by the solution manager to be one of insufficient and overly sufficient to satisfy the future workload level, wherein the one or more actions to be taken comprises causing the addition of one or more servers to address the future workload level when the current deployment of servers is estimated to be insufficient and wherein the one or more actions to be taken comprises causing the removal of one or more servers to address the future workload level when the current deployment of servers is estimated to be overly sufficient;
   wherein the deployment manager further comprises: (i) a monitoring module for providing access to workload data; (ii) a provisioning module for performing resource provisioning;
   (iii) a tuning interface module for changing one or more configuration parameters associated with the one or more of the servers; and (iv) a throttling interface module for causing a manipulation of one or more admission queues on the one or more of the servers.

23. The system of claim 22, wherein the servers are deployable to implement execution of an application.

24. The system of claim 22, wherein at least one of the solution manager and deployment manager operate autonomically.

25. The system of claim 22, wherein the one or more actions comprise at least one of server provisioning, server tuning, and admission control.

26. The system of claim 22, wherein the solution manager estimates whether a current deployment of servers is one of insufficient, sufficient, and overly sufficient based on one or more service objectives.

* * * * *